US009423495B1

(12) United States Patent
Chang et al.

(10) Patent No.: US 9,423,495 B1
(45) Date of Patent: Aug. 23, 2016

(54) SHIP-BASED OVER-THE-HORIZON RADAR

(71) Applicant: Raytheon Company, Waltham, MA (US)

(72) Inventors: Kaichiang Chang, Northborough, MA (US); Drew S. Ganter, Woodland Park, CO (US); Michael Anderson, Nashua, NH (US)

(73) Assignee: Raytheon Company, Waltham, MA (US)

( * ) Notice: Subject to any disclaimer, the term of this patent is extended or adjusted under 35 U.S.C. 154(b) by 326 days.

(21) Appl. No.: 14/185,219

(22) Filed: Feb. 20, 2014

(51) Int. Cl.
*G01S 13/04* (2006.01)
*G01S 13/90* (2006.01)
*H01Q 7/00* (2006.01)
*H01Q 1/34* (2006.01)
*H01Q 11/10* (2006.01)

(52) U.S. Cl.
CPC ............... *G01S 13/04* (2013.01); *G01S 13/90* (2013.01); *H01Q 1/34* (2013.01); *H01Q 7/00* (2013.01); *H01Q 11/10* (2013.01)

(58) Field of Classification Search
CPC .... G01S 13/04; G01S 13/90; G01S 13/0218; G01S 13/46; H01Q 11/10; H01Q 1/34; H01Q 7/00; H01Q 3/46
USPC ......... 342/5, 41, 58, 90, 125, 126, 139, 140, 342/148
See application file for complete search history.

(56) References Cited

U.S. PATENT DOCUMENTS

RE28,217 E * 10/1974 Malech .................. H01Q 25/00 342/376
4,595,925 A * 6/1986 Hansen ................... G01S 13/46 342/120
4,947,174 A * 8/1990 Lehman ................. H01Q 17/00 244/121
6,914,554 B1 * 7/2005 Riley ......................... G01S 7/02 244/3.14
2015/0316642 A1* 11/2015 Robinson .............. G01S 7/2921 342/159

FOREIGN PATENT DOCUMENTS

GB  WO 2008152354 A1 * 12/2008 ........... G01S 7/4004
WO  WO 2006075992 A2 * 7/2006 ......... G01S 13/0218

OTHER PUBLICATIONS

Khan, Rafaat H., "Target Detection and Tracking with HF Radar using Reciprocal SAR Techniques", IEEE AES Systems Magazine, Jan. 1997, 4 pages.

(Continued)

*Primary Examiner* — John B Sotomayor
(74) *Attorney, Agent, or Firm* — Daly, Crowley, Mofford & Durkee, LLP

(57) ABSTRACT

A ship-based over-the-horizon (OTH) radar system provides mobile, persistent, wide-area air and ship surveillance across large ocean expanses and in anti-access/area denial (A2AD) environments. A transmit ship may include a log-periodic antenna (LPA) array adapted for use on a ship and a receive ship may include a plurality of monopole or dipole whip antennas. The transmit/receive antenna is fronted by a ground screen, which can be sized taking into account the sea as a naturally reflective surface. The transmit/receive ship can include advanced software to compensate for ship movement and synthetic aperture radar (SAR) techniques can be employed to includes the effective size of the radar receiver aperture. A modular design, using standard commercial container ships and shipping containers, allows for rapid deployment/stowage of radar equipment. Related methods are also described.

20 Claims, 13 Drawing Sheets

(56) References Cited

OTHER PUBLICATIONS

Xue et al., "Surface Current Extraction by Onboard High Frequency SAR", IEEE, 2006, 4 pages.

Chen et al., "Signal Processing Algorithm of Spaceborn SIMO HF-SAR for Three-Dimensional Topside Ionosphere Exploration", School of Electronics and Information Engineering, BeiHang University, China, 4 pages.

Chen et al., "Image Formation Algorithm for Topside Ionosphere Sounding with Spaceborne HF-SAR System", IEEE, 2008, 4 pages.

Peng et al., "An Improved Model of HF-SAR for Estimating Surface Current Velocity", Military Deputy Bureau of Shanghai Region, China; Electronics Engineering College, Naval Univ. of Eng., China, 6 pages.

Xue et al., "Feasibility of Extracting Sea Surface Current by HF-SAR", 2006 IEEE International Symposium on Signal Processing and Information Technology, 5 pages.

\* cited by examiner

SHIP-BASED OVER-THE-HORIZON RADAR

BACKGROUND

Over-the-horizon (OTH) radar systems capable of providing real-time, wide area persistent air and/or ship surveillance are known. Such systems have a range of over one thousand kilometers (km) and can cover over one million square nautical miles ($nm^2$). However, existing OTH radar systems use massive transmit (TX) and receive (RX) antenna structures that can only be installed on large tracts of flat land and cannot be readily moved. This limits the regions of land, sea, and air which can be covered by OTH radar. In contrast, airborne and ship-based line of sight radars are highly mobile, however they have limited persistent coverage areas compared to OTH.

SUMMARY

Concepts and techniques described herein relate to OTH radar systems wherein the radar transmitter and/or receiver are located upon a ship.

In accordance with these concepts and techniques, a method for providing an over-the-horizon (OTH) radar system includes: providing a receive ground screen comprising a reflective surface and adapted to form a generally continuous flat surface supported on a receive ship; providing a receive antenna adapted to be supported on the receive ship and configured to receive radar signals reflected off one or more objects within a selected target area and refracted off the Ionosphere; and providing a radar receiver to process the received radar signals to detect the one or more objects.

In one embodiment, method utilizes a ship-based transmitter and further includes: providing a transmit ground screen comprising a reflective surface and adapted to form a generally continuous flat surface supported on a transmit ship; providing a transmit antenna adapted to be supported on the transmit ship and configured to transmit radar signals towards the Ionosphere; and providing a radar transmitter to generate radar signals for transmission by the transmit antenna, wherein the transmitted radar signals have a selected frequency, polarization, and direction to refract off the Ionosphere towards a selected target area, and to reflect off the one or more objects within the selected target area to be received by the receive ship. The frequency, polarization, and direction of the transmitted radar signals can be selected based upon the position of the receive ship and ionospheric conditions.

In some embodiments, the receive ground screen and/or the transmit ground screen comprise a plurality of reflective panels bonded together (electrically and/or mechanically) to form a generally continuous flat surface. The receive antenna and/or transmit antenna may be disposed over the respective receive ground screen and/or transmit ground screen. The size of the ground screens can be reduced significantly by taking into account the sea as a reflective medium. The ship motion and sea rolling can be compensated using modern advanced digital beamforming techniques.

In exemplary embodiments, the ship-based method further includes providing a plurality of equipment shelters capable of being arranged on the transmit and/or receive ship to form a generally continuous flat surface to support the respective ground screen. One or more of the equipment shelters is adapted to shelter radar equipment. The receive antenna, transmit antenna, receive ground screen, and/or transmit ground screen may be adapted to be readily disassembled and stored within or more of the equipment shelters. One or more of the equipment shelters may be adapted to contain an electrical generator. Any of the shelters may comprise a standard commercial shipping container, such as an International Organization for Standardization (ISO) shipping container.

In some embodiments, the ship-based method further includes providing a radome upon the receive ship and/or transmit ship to protect the respective receive and/or transmit antenna. The radome comprises a plurality of walls with emissivity that doesn't degrade performance.

Embodiments of the method include one or more of the following: the receive antenna comprises an array of twin whip antenna elements; the transmit antenna comprises a log-periodic antenna (LPA) array; the radar receiver and/or radar transmitter are/is configured to compensate for movement of the ship; and the radar receiver is configured to use synthetic aperture radar (SAR) techniques to increase the effective antenna aperture size. In some embodiments, the receive antenna includes an array of loop antennas attached to the receive ship's hull by magnets, allowing the receive antenna to be easily assembled and disassembled.

According to another aspect of the concepts and techniques described herein, a second method (which can utilize either a ground-based transmitter or a ship-based transmitter) includes: transmitting radar signals from a transmit antenna, the transmitted radar signals having a selected frequency, polarization, and direction to refract off the Ionosphere towards a selected target area, and to reflect off one or more objects within the selected target area; receiving radar signals at a receive antenna located upon a receive ship, the received radar signals having been reflected off the one or more objects in the target area in response to the transmitting; and detecting the one or more objects within the target area based upon the received radar signals. This method further includes: determining the position of the receive ship; and determining the ionospheric conditions, wherein the frequency, polarization, and direction of the transmitted radar signals are selected based upon the position of the receive ship and ionospheric conditions.

According to another aspect of the concepts and techniques described herein, an OTH radar system includes a receive ship; a receive ground screen having a generally continuous, flat, reflective surface and supported on the receive ship; a receive antenna supported on the receive ship and configured to receive radar signals, the received radar signals having been reflected off one or more objects within a target area and refracted off the Ionosphere; and a radar receiver to detect the one or more objects within the target area based upon the received radar signals.

BRIEF DESCRIPTION OF THE DRAWINGS

Various embodiments of the concepts, structures, and techniques sought to be protected herein may be more fully understood from the following detailed description of the drawings, in which.

DETAILED DESCRIPTION

Before describing embodiments of the invention, some concepts and terminology are explained. As used herein, the term "target area" is used herein to refer to a specific geographic area (which may include land, sea, and/or air) of interest, such as an area over which to perform surveillance. The terms "illumination" and "illuminate" herein refer to a process of performing radar surveillance, tracking, and/or detection with a target area. The term "Panamax-sized" is used herein to describe the size limit for ships travelling through the Panama Canal.

Figure 1:
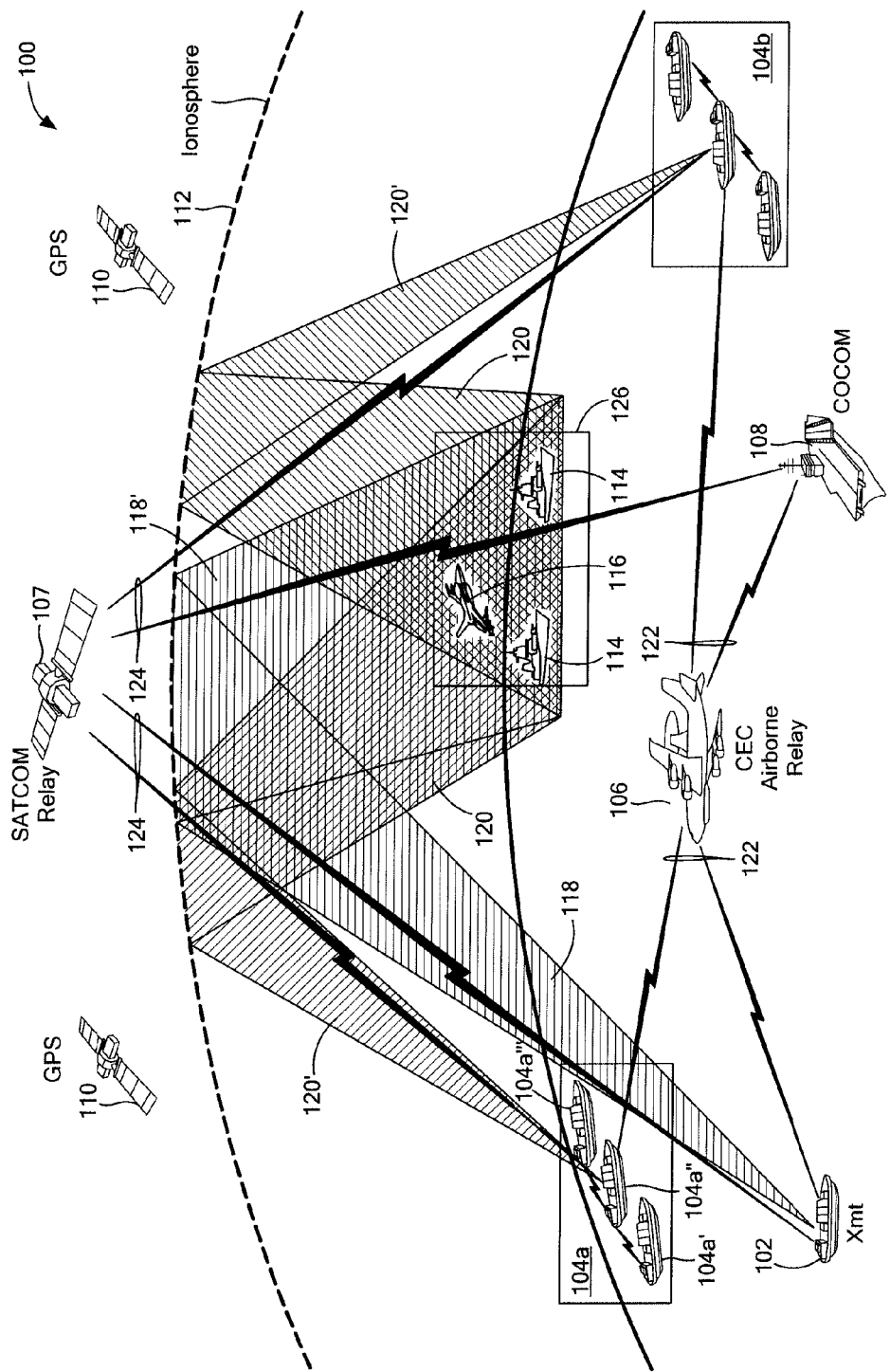
FIG. 1 is a diagram illustrating an exemplary ship-based over-the-horizon (OTH) radar system.

FIG. 1 shows an exemplary embodiment of an over-the-horizon (OTH) radar system 100 including a transmit ship 102 and one or more receive ships 104. Although two receive ships 104a, 104b are shown, it will be appreciated that the concepts and techniques described herein are applicable to any practical number of receive ships.

The exemplary OTH radar system 100 further includes an airborne relay 106, a satellite communications (SATCOM) relay 107, and a combatant command platform (COCOM) 108. In a particular embodiment, the ships 102, 104, 108 and/or airborne relay 106 include a GPS receiver to receive GPS signals (containing geo-position and time information) from a plurality of GPS satellites 110 and use these signals for purposes discussed below.

Although an exemplary transmit ship 102 and receive ship 104 are discussed in detail below, a brief overview is given herein. The transmit ship 102 includes a radar transmitter coupled to a transmit antenna and each of the receive ships 104 includes a radar receiver coupled to a receive antenna. It will be appreciated, after reading the present disclosure, that the transmit antenna and the receive antenna generally include a plurality of antenna elements (e.g. arrays of antenna elements) to perform steering of the transmit beam. In some embodiments, the transmit ship 102 and/or any of the receive ships 104 have a plurality of equipment shelters disposed upon the ship's deck. The transmitter/receiver equipment may be housed within one or more of the equipment shelters. The transmit ship 102 may include an additional antenna used for downrange ionospheric sounding, as discussed below in conjunction with FIG. 2. It will be appreciated by those skilled in the art that vertical incidence sounding is not required because the layer height and associated critical frequencies can be measured using downrange sounding data with some minor loss of accuracy/fidelity.

Within the exemplary OTH radar system of FIG. 1, the transmit ship 102 and/or any of the receive ships 104 may include a wireless transceiver configured to send and/or receive radio frequency (RF) signals, microwave signals, or optical signals. The transmit ship 102, the receive ships 104, and the COCOM 108 may be in communication with the airborne relay 106 using suitable wireless communication links 122. The communication links 122 can include, but are not limited to, RF links, microwave links, and/or optical links. In addition, one or more of the ships 102, 104, 108 may be in communication with the SATCOM relay 107 using any suitable unidirectional or bidirectional satellite communication links 124. In one embodiment, the COCOM 108 includes a satellite transmitter to send information to the SATCOM relay 107 (i.e. an "uplink") and the transmit ship 102 and/or receive ships 104 include a satellite receiver to receive information from the SATCOM relay 107 (i.e. "downlinks"). In some embodiments, at least one of the ships establishes direct wireless links to other ships nearby. Information communicated with to/from the transmit ship includes radar dwell schedules, platform positions, and equipment status. Information communicated between the receive ship and the COCOM includes system status, platform positions, target tracks (formed from the received radar signals), and environmental conditions.

In operation, the transmit ship 102 generates and transmits radar signals 118 which are directed up towards the Ionosphere 112 and refracted back towards the ground as signals 118', using a process known as ionospheric refraction. The refracted signals 118' are generally directed downwards towards the ground to illuminate a selected target area 126. Next, the signals 118' reflect off various objects within the target area to produce backscatter signals 120; such objects can include, for example, ships, aircraft, missiles, and land-based vehicles. The backscatter signals 120 reflect back up to the Ionosphere 112 and down to one of more of the receive ships 104 (the received signals are generally designated as signal 120' in FIG. 1). Next, the receive ships process the received signal 120' to detect targets, such as ships 114 and/or aircraft 116, within the illuminated target area. Because the targets are detected indirectly via the Ionosphere, line of sight between the transmit/receive ships and the targets is not needed; thus, mobile, OTH radar is provided. The radar system 100 is operated by personnel ("operators") onboard the transmit ship 102, receive ships 104, and/or COCOM 108.

The transmitted radar signals 118 may be high-frequency (HF) radio waves, sometimes referred to as "shortwave." It will be appreciated that the transmitted radar signals 118 must have sufficiently high power to overcome interference, both active and passive, such that the received signal 120' has a sufficiently high signal-to-noise ratio (S/N) for target detection.

As is known in the art, ionospheric refraction is a bending, through a complex process involving refraction, of electromagnetic waves/signals propagating in the Ionosphere back toward the ground. The amount of ionospheric bending depends on the extent to which the radar signal penetrates the Ionosphere (which is a function of the signal frequency), the angle of incidence, the polarization of the wave/signal, and ionospheric conditions, such as the ionization density. Existing OTH system typically use vertical incident sounding ("overhead" sounding) or oblique sounding ("downrange" sounding) techniques to measure layer height and associated critical frequencies. These measurements are used to determine suitable radar signal characteristics—such as direction, frequency, polarization—based on the current ionospheric conditions. Additional signal characteristics—such as bandwidth, modulation type, pulse width, and pulse repetition frequency—may be selected based upon the type of target to be detected (e.g. ship, aircraft, or missile).

To illuminate a target area, the transmitter and receivers are dynamically reconfigured/recalibrated, in a coordinated manner, such that a suitable signal path can be established from the transmit ship to the target area (via the Ionosphere), and from the target area to the receive ships (also via the Ionosphere). Because the ship positions and environmental conditions can continually change, an adaptive process is employed to select suitable transmit signal characteristics, in real-time or near real-time, based upon current transmitter and receiver positions. Other factors may also be considered, including maximum useable frequency derived from the sounding data and the presence of a clear channel (i.e. a channel free of other external interference sources), which can be derived from a continuously running passive spectrum monitor receiver located on a receive ship. Thus, in one embodiment, the receive ships 104 communicate their positions (determined via GPS or other means, such as inertial measurement) to the transmit ship 102 via the wireless communication links 122 and airborne relay 106, or via the satellite communication lines 124 and SATCOM relay 107. In turn, an operator may select suitable radar signal characteristics and reconfigure the transmitter and receivers accordingly, using information based on the transmit ship's downrange ionospheric sounding capability. If the operator determines that no radar signal path can be established based upon the current ship positions and the current ionospheric conditions, the operator may instruct the transmit ship and/or receive ships to move to change positions. Because the ships may be in motion and the ionospheric conditions change over time, this coordinated recalibration process may be repeated to maintain persistent illumination over the target area.

In some embodiments, the radar transmitter and/or radar receivers are configured to compensate for antenna movement due to pitching and/or rolling of ship. In embodiments, the transmitter and/or receivers are configured to compensate for propagation effects caused by the Ionosphere.

Because the receive antenna is supported onboard a ship 104, those in the art will appreciate that the system 100 must use a receive antenna that is substantially smaller than receive antennas used in existing OTH radar systems, including so-called "relocatable" over-the-horizon radar (ROTHR) systems. In one embodiment, the system 100 achieves a smaller receive antenna by employing synthetic aperture radar (SAR) techniques. As is known in the art, SAR techniques typically use relative motion between an antenna and its target area to provide distinctive long-term coherent-signal variations, which are exploited to obtain finer spatial resolution (i.e. a "wider" effective aperture) than is otherwise possible.

In one embodiment, the depicted ships 104a', 104a", and 104a''' represent a single, moving receive ship at three different points in time (and thus, three different positions). The single receive ship 104 captures radar information at each of the different positions and employs SAR-based signal processing techniques to achieve an effective aperture that is wider than the receive ship's physical aperture. In another embodiment, the depicted ships 104a', 104a", and 104a''' represent three different ships at generally the same point in time. The ships, which may be stationary or moving, maintain a closely-spaced formation referred to as a "cohered array." Each of the ships may use SAR techniques on locally received radar signal information to achieve a wide effective aperture. Moreover, the system 100 may employ a distributed SAR technique wherein radar signal information received contemporaneously by two or more of the receive ships is combined to achieve an effective aperture that is wider than any single receive ship could achieve. In an exemplary embodiment, one of the ships, designated the primary signal processing ship, receives radar signal information from the other receive ships and performs the distributed SAR-based signal processing.

The OTH radar system 100 may operate in several different modes. In a first mode, the system 100 may operate as a bi-static (or more generally, multi-static) radar to provide air, ground, and/or sea surveillance. In another mode of operation, the system 100 can provide ballistic missile tracking using known time difference of arrival (TDOA) techniques. In embodiments, the transmit ship 102 and a receive ship 104 are separated by up to one thousand (1,000) nautical miles.

Although the exemplary system 100 utilizes a mobile transmitter and mobile receivers (i.e. ships 102, 104), it should be appreciated that mobile OTH radar can be achieved by locating either the radar transmitter or the radar receivers on land. In one embodiment, the system includes a high-power, land-based transmitter and one or more mobile ship-based receivers.

It should be appreciated that the system 100 provides mobile, persistent, wide-area radar capability, such as air and ship surveillance across large ocean expanses and in anti-access/area denial (A2AD) environments.

Figure 2:
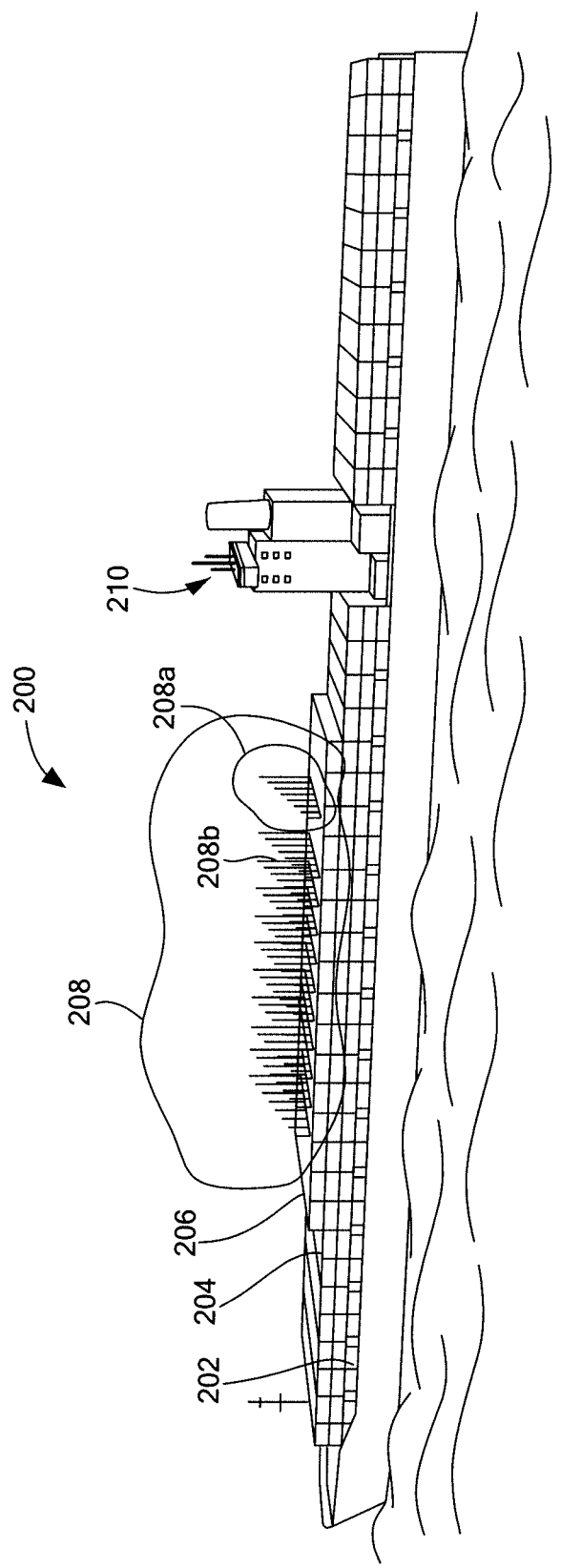
FIG. 2 is a perspective view of an exemplary transmit ship for use in an OTH radar system.

Referring now to FIG. 2, an exemplary transmit ship 200 for use in a ship-based OTH radar system, is shown. The transmit ship 200, which may be the same as or similar to transmit ship 102 in FIG. 1, has a generally open, flat deck 202 upon which a plurality of equipment shelters 204 are disposed. In exemplary embodiments, the transmit ship 200 is a Panamax-sized container ship and one or more of the equipment shelters 204 is a standard commercial shipping container, such as an International Organization for Standardization (ISO) shipping container. The equipment shelters 204 may be arranged to provide a generally continuous, flat surface to support a ground screen 206; in embodiments, the shelters 204 are arranged in a grid-wise pattern, as shown. The ground screen 206 (sometimes referred to as a "ground plane") may be comprised of a plurality of panels electrically bonded together to provide a continuous, flat surface; in embodiments, the panels are flight deck modules generally based upon the Tactical Expandable Maritime Platform (TEMP), which is a program developed by the Defense Advanced Research Projects Agency (DARPA). The ship's deck also supports a transmit antenna 208 used to transmit radar signals towards the Ionosphere. In embodiments, the transmit antenna 208 is disposed over the ground screen, as shown. In some embodiments, the transmit ship 200 further includes a downrange antenna 210 to perform ionospheric sounding.

Figure 3:
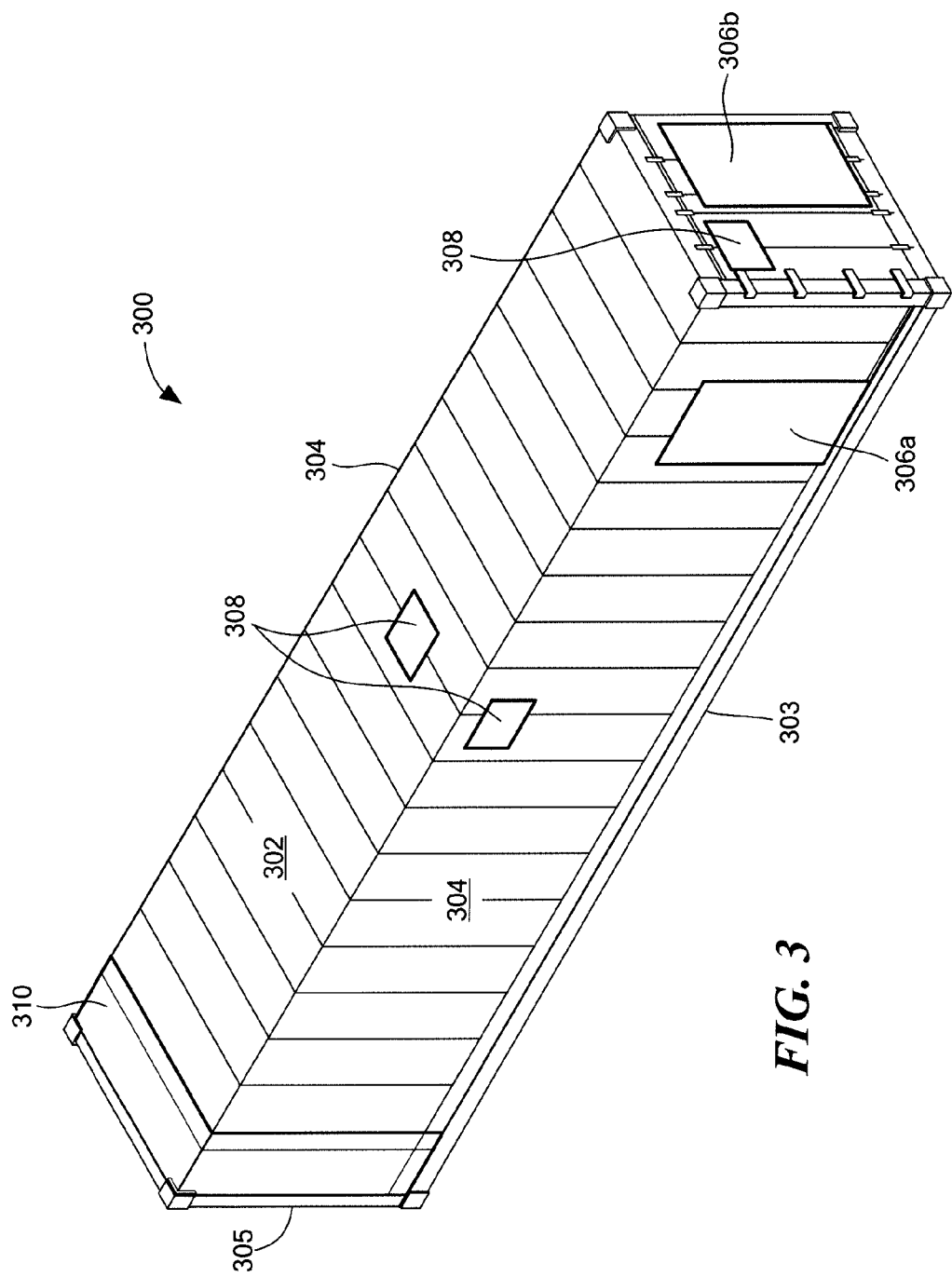
FIG. 3 is a perspective view of an exemplary equipment shelter for use in an OTH radar system.
Figure 4:
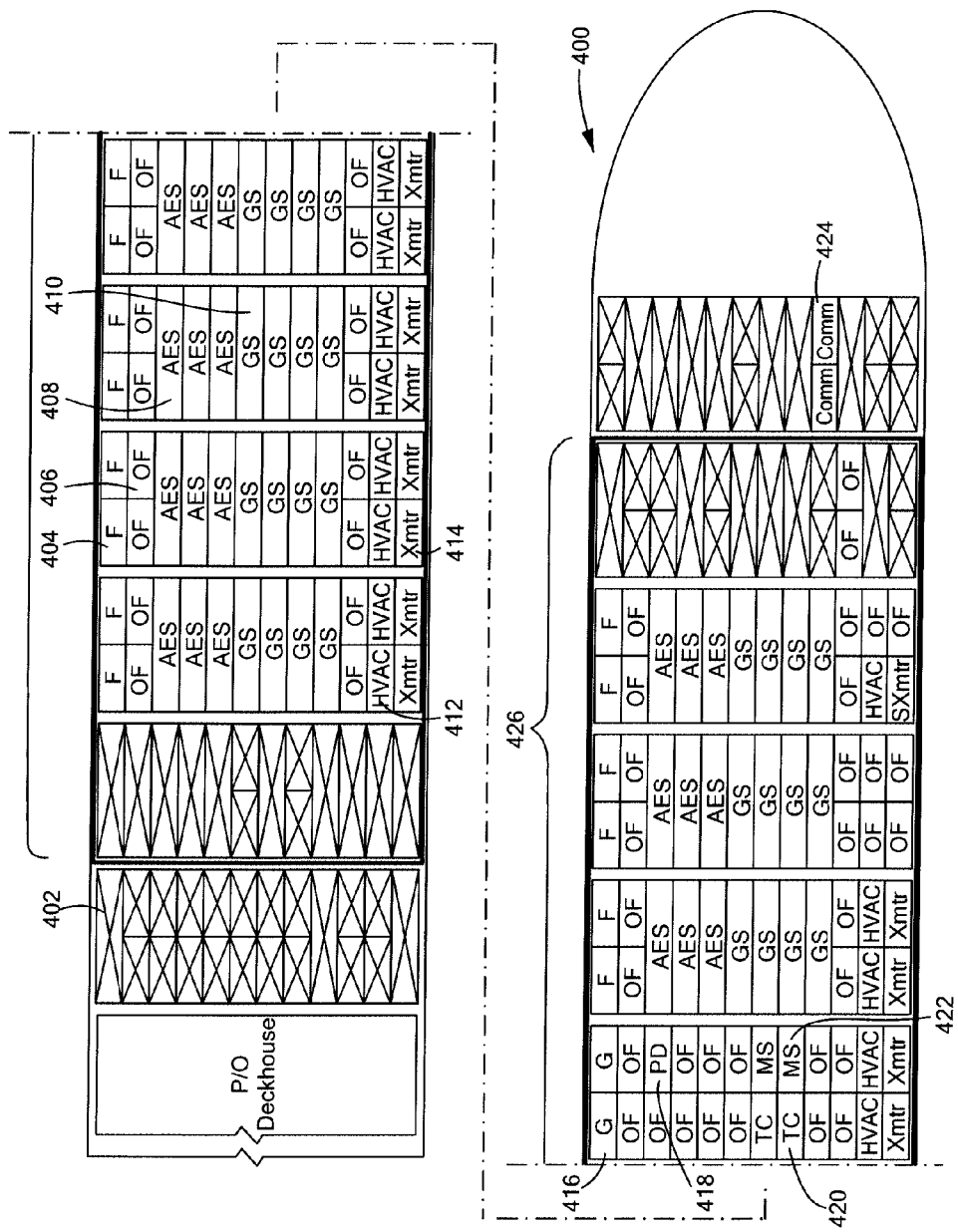
FIG. 4 is a diagram of an exemplary equipment shelter layout on a transmit ship.

The equipment shelters 204 may provide storage and/or shelter for various equipment and personnel to operate and maintain the communications and radar systems, including, but not limited to, radar transmitter equipment; communications equipment; fuel; electrical generators; heating, ventilation, and air-conditioning (HVAC) equipment; and maintenance facilities. In one embodiments, the ground screen 206 and/or transmit antenna 208 can be readily disassembled and stored within one or more of the equipment shelters 204. An exemplary equipment shelter is shown in FIG. 3 and an exemplary equipment shelter layout on a transmit ship is shown in FIG. 4; both figures are discussed in detail below.

As is known in the art, existing OTH radar systems, including ROTHR systems, utilize massive transmit and receive antennas installed on land. Existing OTH radar transmitter antennas are approximately three hundred (300) meters long and upwards of sixty (60) meters high, due to use of half-wave, log-periodic dipole design. The antenna elements are typically suspended on wires. In addition, a massive front ground screen is typically required, causing the transmit antenna to occupy a surface area up to fifty (50) acres.

In exemplary embodiments, the transmit antenna 208 comprises a log-periodic antenna (LPA) array adapted to fit on a ship. The LPA array 208 includes a plurality of LPAs (typified by LPA 208a), each of which includes a plurality of antenna elements (typified by element 208b). In an exemplary embodiment, the LPA array includes between twelve (12) and sixteen (16) LPAs, each having ten (10) antenna elements. In some embodiments, at least one LPA is provided to transmit downrange ionospheric sounding signals. Adjacent LPAs are arranged generally parallel to each other, and each of the LPAs 208a is positioned generally transverse to the ship's longitudinal axis, as shown. An exemplary LPA is discussed below in conjunction with FIG. 5.

In contrast to existing OTH radar transmit antennas which occupy a surface area up to fifty (50) acres, the LPA array 208 and ground screen 206 are adapted to fit upon a Panamax-sized container ship, with a height of about thirty two (32) feet. A smaller transmit antenna is possible within the mobile, ship-based OTH radar system for several reasons. First, because sea-water is a naturally electromagnetically reflective medium, the ground screen 206 can be substantially smaller compared with a land-based antenna. In addition, because the transmit ship and receive ships can be repositioned relatively close to a target, the radar signals can have a lower power (i.e. lower antenna gain requirement) compared with land-based OTH systems; a lower gain requirement allows for fewer antenna elements to be used. Further, container ships have an open, flat deck which may cause less interference compared with buildings, mountains, etc. on land, further lowering the antenna gain requirement (and required number of antenna elements). Finally, whereas existing OTH radar transmit antennas typically use dipole antenna elements suspended on wires, the LPA array 208 may use 6" diameter monopole elements, which allows for shorter relative length without sacrificing significant gain.

In an exemplary embodiment, the transmit antenna array 208 is partially enclosed within a radome for environmental protection. The radome may comprise a plurality of walls with emissivity that does not degrade performance. An exemplary radome is discussed below in conjunction with FIG. 9.

In some embodiments, the transmit ship 200 includes a satellite communications receiver/transceiver to communicate with the SATCOM relay 107 (FIG. 1). The exemplary ship 200 may also include a RF transceiver to communicate with the airborne relay 106. The satellite and/or RF transceiver may include an antenna portion (not shown) electrically coupled to a radio transceiver. In embodiments, the transceiver equipment is sheltered within one or more of the equipment shelters 204.

Referring now to FIG. 3, an exemplary equipment shelter 300 may be the same as or similar to any of the equipment shelters 204 shown in FIG. 2. As shown, the exemplary shelter 300 comprises an enclosed, box-shaped structure having a bottom surface 303, side surfaces ("sides" or "walls") 304, end surfaces ("ends") 305, and a top surface 302. In embodiments, the equipment shelter 300 may comprise a standard commercial shipping container, such as an ISO shipping container, having a width between 7 feet and 9 feet and a length between 12 feet and 21 feet.

The shelter 300 may include one or more access ways 306 to provide personnel access to the enclosed area, such as an access way 306a positioned along a side 304 and/or an access way 306b positioned along an end 305. The access ways 306 may be permanent openings or temporary passage ways (e.g. hatches, doors, and removable panels). As shown in FIG. 4, a plurality of equipment shelters may be arranged close together in a generally grid-wise pattern. To allow personnel to move between the shelters, the access ways of adjacent shelters may be aligned. For example, if two shelters are positioned adjacent and lengthwise parallel, the respective side access ways 306a may be aligned; if two shelters are adjacent end-to-end, the respective end access ways 306b may be aligned. In some embodiments, a pair of stacked equipment shelters includes respective top and bottom access ways to allow vertical access between the shelters.

In addition, the equipment shelter 300 may include openings 308 to provide interconnections (power, fuel, and/or communications) between adjacent shelters. Some of the openings 308 may be covered by ventilated panels to provide ventilation between shelters and/or a shelter and the outdoors. In some embodiments, the equipment shelter 300 includes an air conditioning unit 310 or other equipment to cool the systems stored therein; for this purpose, standard commercial refrigerated shipping containers may be used. In embodiments, the shelter 300 may further include fire warning and/or suppression equipment. In a particular embodiment, the shelter 300 provides electromagnetic (EM) isolation to limit interference with equipment housed in other shelters and/or outside the shelters.

Referring now to FIG. 4, an exemplary equipment shelter layout (sometime referred to as a "load out") 400 upon a transmit ship (such as ship 200 in FIG. 2), is shown from a top view perspective. The layout 400 includes several different kinds of equipment shelters, and each shelter is generally based on either a forty-foot equivalent unit (referred to as a "FEU", typified by shelter 410) or a twenty-foot equivalent unit (referred to as a "TEU" and typified by shelter 404). The number and arrangement of containers is configurable to accommodate different sized ships/decks.

Although the concepts described herein are not limited to any specific kinds of equipment shelters, several kinds of shelters are contemplated. Generator containers (typified by container 416 and generally labeled as "G") house electric generators to power the radar and communications systems. Fuel containers (typified by container 404 and generally labeled "F") store fuel used by the generators. In one embodiment, the generators operate using diesel fuel, which is stored in fuel containers. The exemplary layout 400 also includes power distribution containers (typified by container 418 and generally labeled "PD") that contain transformers, circuit breakers, control and monitoring equipment, and other equipment to regulate and distribute power to radar and communications systems.

Antenna element storage containers (typified by container 408 and generally labeled "AES") and ground screen stowage containers (typified by container 410 and generally labeled "GS") are provided to store unused/inactive antenna elements and ground screen panels, respectively. Transmitter equipment containers (typified by container 414 and generally labeled "Xmtr") and communications containers (typified by container 424 and generally labeled "Comm") store radar and communications equipment, respectively. Transmitter control containers (typified by container 420 and generally labeled "TC") may also be provided to store radar control systems and equipment. Non-radar cargo containers (typified by container 402) may be provided to store cargo unrelated to OTH radar operation.

Maintenance shop containers (typified by container 422 and generally labeled "MS") provide shelter for personnel to perform various maintenance tasks. HVAC containers (typified by container 412 and generally labeled "HVAC") contain heating, ventilation, and air conditioning (HVAC) equipment used to maintain suitable environmental conditions for the communication systems, radar system, and personnel. To provide space for interconnections (communications cabling, HVAC, fuel, etc.) and personnel access to equipment containers, shelter-sized open spaces (referred to as "open frames", typified by space 406, and generally labeled "OF") may be included within the layout. In some embodiments, a plurality of containers, such as containers 426, are arranged to form a generally continuous, flat surface to support a ground screen.

Figure 5:
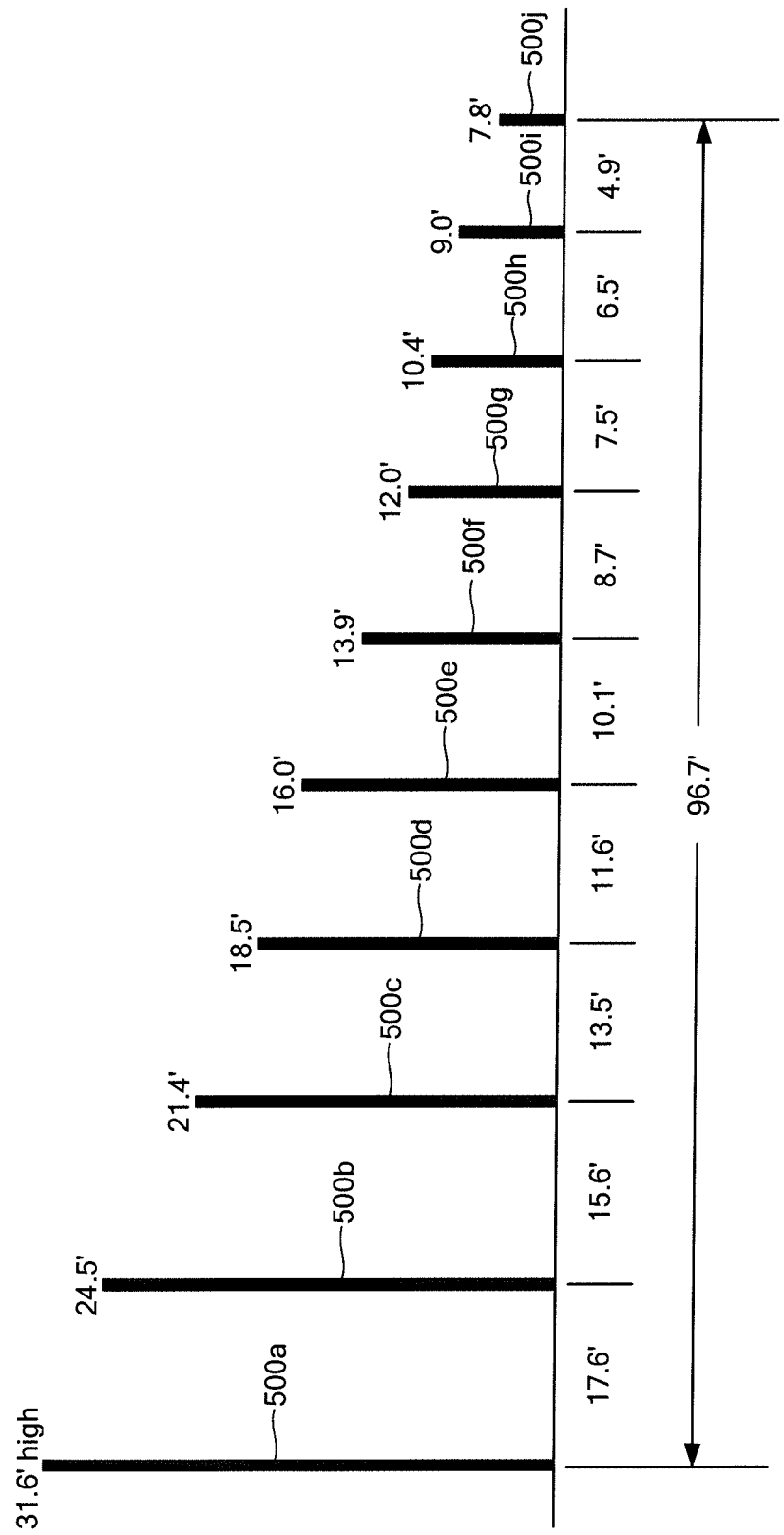
FIG. 5 is a diagram of an exemplary log-periodic antenna (LPA)

Referring now to FIG. 5, an exemplary LPA 500, which may be the same as or similar to any of the LPAs 208a in FIG. 2, is shown. The LPA 500 generally includes a plurality of antenna elements having different heights. The antenna element heights may be selected based upon antenna electrical requirements, including gain, voltage standing wave ratio (VSWR), pattern coverage, polarization, and operating frequency band. The antenna elements are generally arranged along a common plane, from tallest to shortest, and the distance between adjacent elements may vary, with the distance between taller elements typically greater than the distance between shorter elements. The antenna elements are electrically coupled to the radar transmitter equipment and may be mechanically coupled to (i.e. supported upon) a ground screen 206, as shown in FIG. 2.

The exemplary LPA 500 includes ten (10) antenna elements 500a-500j having heights 31.6, 24.5, 21.4, 18.5, 16.0, 13.9, 12.0, 10.4, 9.0, and 7.8 feet, respectively, with each element having a cylindrical shape with a 6" diameter. Thus, whereas existing OTH radar transmit antennas are typically upwards of 180 feet tall, the exemplary LPA 500 is only about 32 feet tall. The distance between adjacent elements, from tallest to shortest, is 17.6, 15.6, 13.5, 11.6, 10.1, 8.7, 7.5, 6.5, and 4.9 feet. Those skilled in the art will appreciate that the concepts discussed herein are not limited to antenna dimensions shown in FIG. 5 and that the number of antenna elements, height of each element, and spacing between elements can be readily varied based upon electrical requirements for a transmit antenna.

Figure 6:
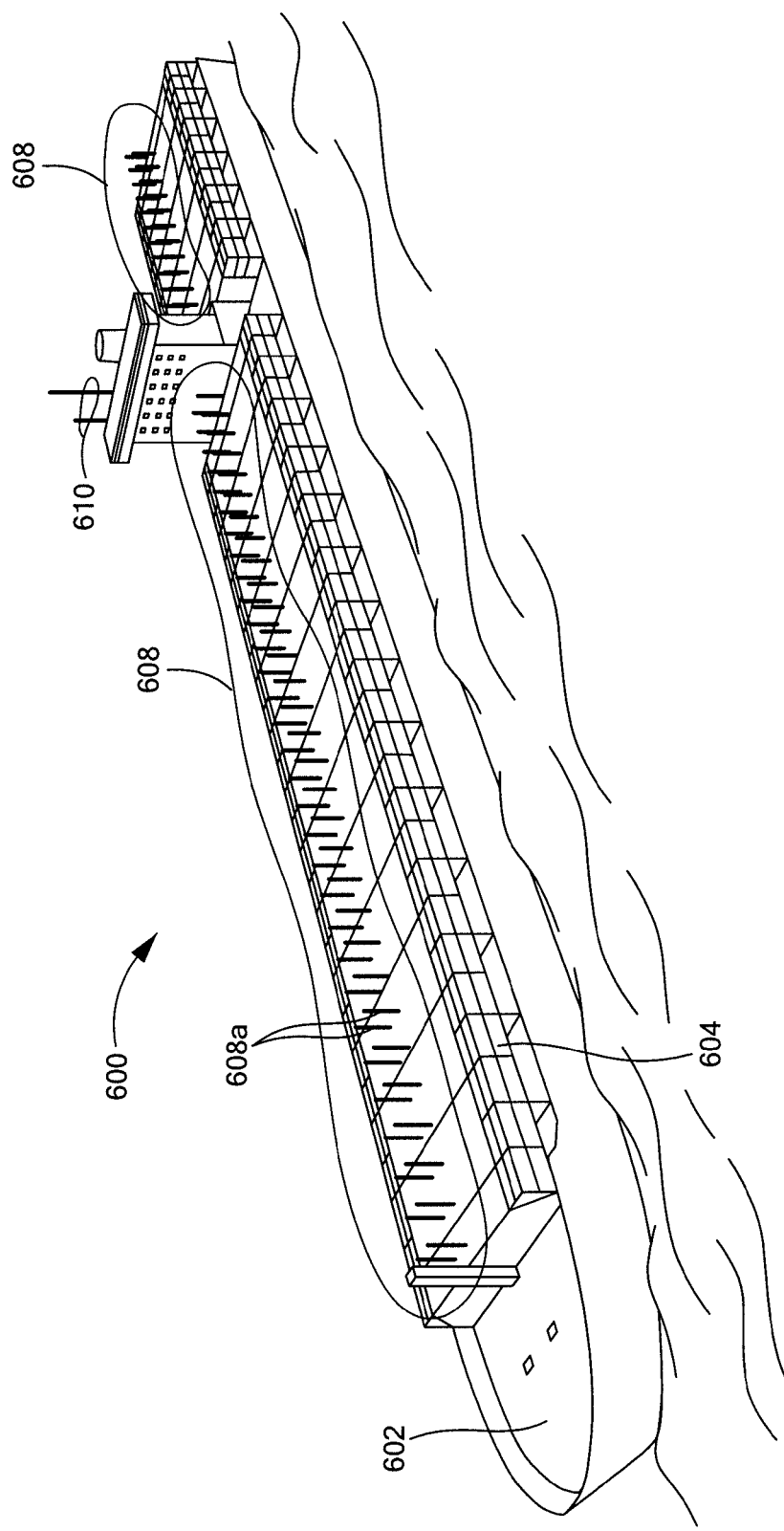
FIG. 6 is a perspective view of an exemplary receive ship for use in an OTH radar system.

Referring now to FIG. 6, an exemplary receive ship 600 for use in a ship-based OTH radar system is shown. The receive ship 600, which may be the same as or similar as any of the receive ships 104 in FIG. 1, has a generally open, flat deck 602 on which a plurality of equipment shelters 604 are disposed. In exemplary embodiments, the receive ship 600 is a Panamax-sized container ship and one or more of the equipment shelters 604 is a standard commercial shipping container, such as an ISO shipping container. The equipment shelters 604 may be arranged in a generally grid-wise pattern to provide a generally continuous, flat surface to support a ground screen 606. The ship's deck also supports a receive antenna 608 used to receive backscattered radar signals reflected from a target area (via the Ionosphere). In embodiments, the receive antenna 608 is disposed over the ground screen, as shown. In embodiments, the receive ship further includes communications antennas 610 for satellite and/or RF communication.

Figure 8:
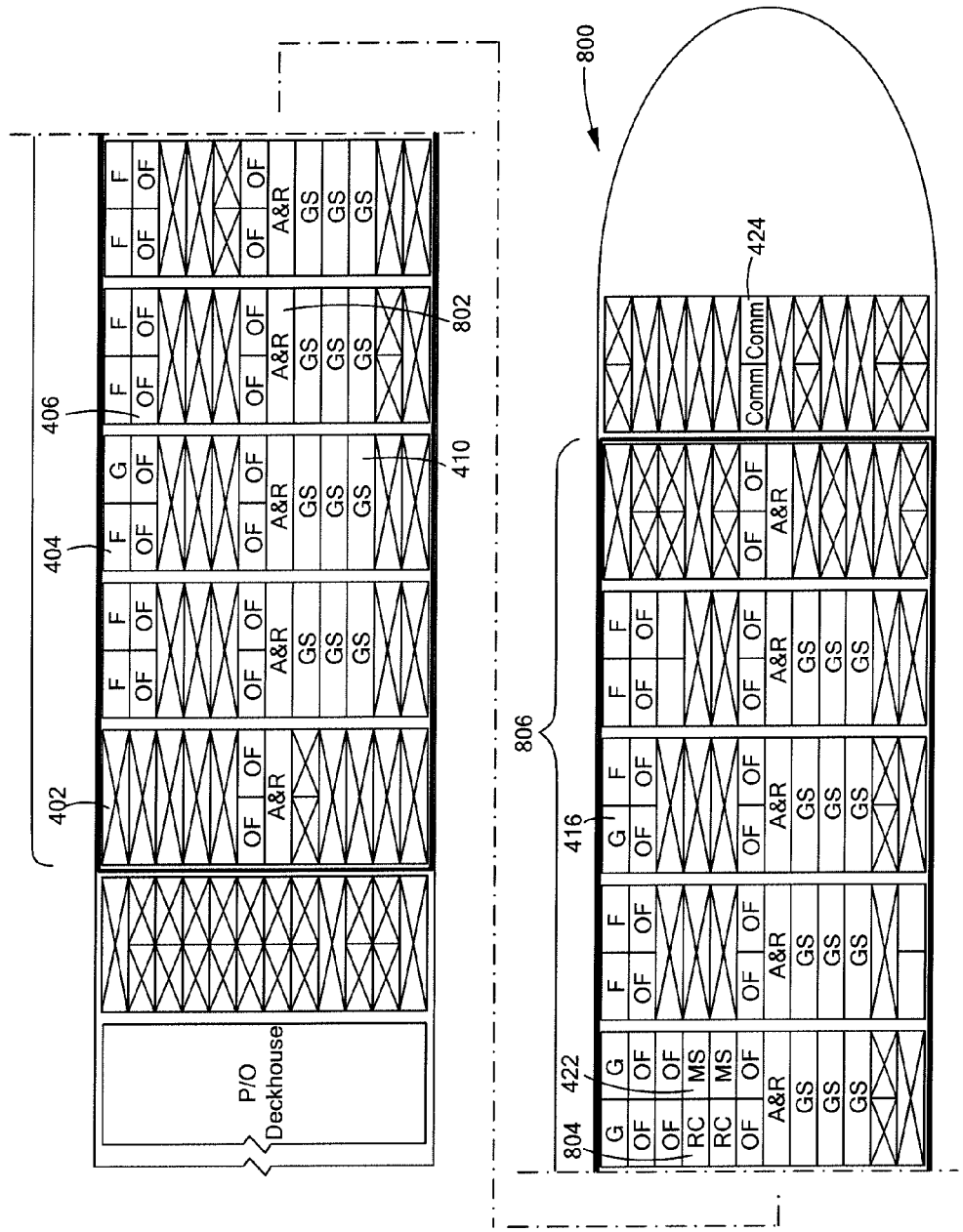
FIG. 8 is a diagram of an exemplary equipment shelter layout on a receive ship.

As with the transmit ship equipment shelters (discussed above in conjunction with FIG. 2), the receive ship equipment shelters 604 provide storage and/or shelter for various equipment and personnel to operate and maintain the communications and radar systems. An exemplary equipment shelter is shown in FIG. 3 and discussed above, whereas an exemplary equipment shelter layout on a receive ship is shown in FIG. 8 and discussed below.

As is known in the art, many existing OTH radar systems, including ROTHR systems, utilize massive receive antennas upwards of 1.5 miles across.

Figure 7:
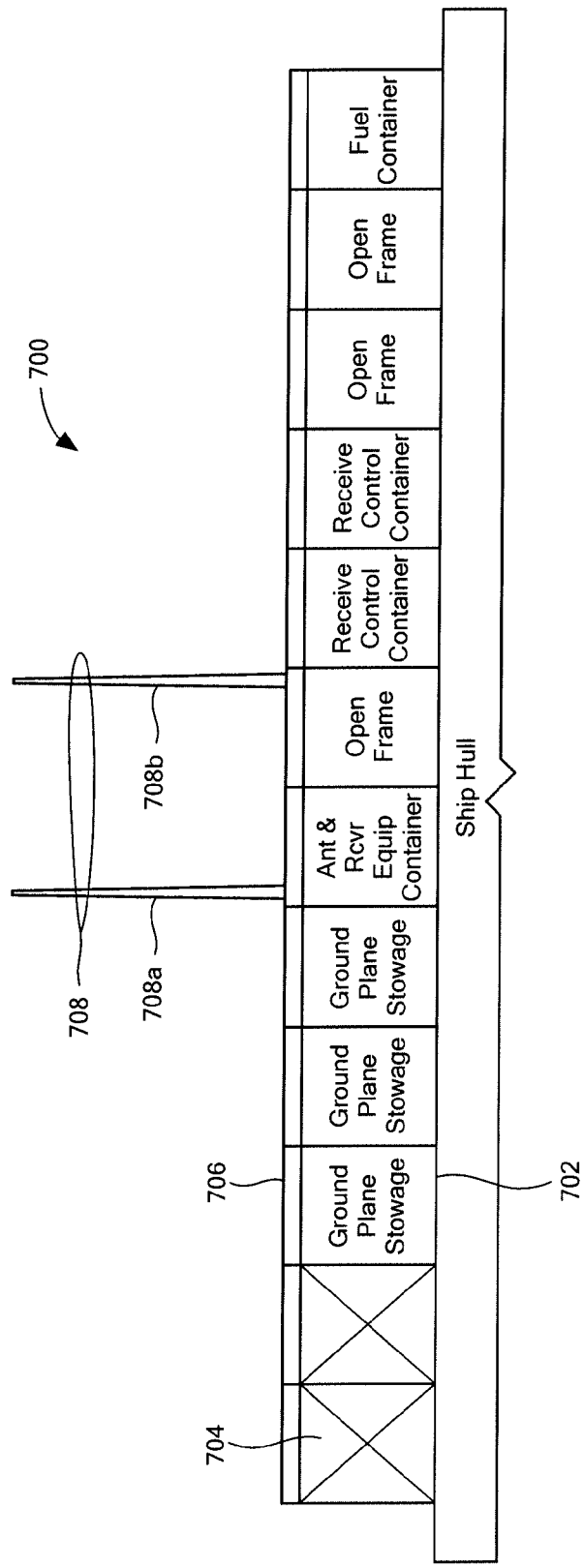
FIG. 7 is a longitudinal, cross-section view of an exemplary receive ship for use in an OTH radar system.

In exemplary embodiments, the receive antenna 608 comprises an array or antennas 608a. Each antenna 608a is a dipole including two generally identical ("twin") whip antenna elements, positioned along a common plan transverse to the ship's longitudinal axis. The array of dipoles generally extends down the center of the ship's longitudinal axis, as shown. The number and arrangement of dipoles in the array 608 generally determines the receiver's aperture size and sensitivity. An exemplary dipole is shown in FIG. 7 and discussed below therewith. To allow the receive antenna to be supported on a ship, one or more receive ships may employ SAR-based signal processing techniques to simulate a larger antenna/aperture, as discussed further above in conjunction with FIG. 1. In an exemplary embodiment, the receive antenna 608 is partially enclosed within a radome for environmental protection, as discussed below in conjunction with FIG. 9. The dipoles 608a may be adapted to be readily erected, disassembled, and stowed in the equipment shelters 604.

In an alternate embodiment, the receive antenna may include an array of loop antennas, which are known in the art. The loop antennas may be attached to the receive ship's hull by magnets, allowing the receive antenna to be easily assembled and disassembled.

FIG. 7 is a longitudinal, cross-section view of an exemplary receive ship 700, which may be the same as or similar to receive ship 600 in FIG. 6. The ship 700 includes a plurality of equipment shelters 704 disposed on a flat, open deck 702. The shelters 704 are arranged to form a generally continuous, flat surface to support a ground screen 706. The ship 700 further includes a plurality of twin whip antennas, with only one antenna 708 visible in the cross-sectional view. The antenna 708 includes a first antenna element 708a and a second antenna element 708b. The antenna elements 700a, 700b are mechanically coupled to the ground screen 706 and/or the equipment shelters 704, and electrically coupled to receiver equipment sheltered housed within the equipment shelters 704. In an exemplary embodiment, each antenna element is about 18 feet long and spaced about 13.67 feet apart. Those skilled in the art will appreciate that different sized antenna elements will be used. A taller element will provide different gain characteristics over the tunable frequency band (typically higher gain at lower frequencies). Wider element spacing can be used, however this risks introducing receive grating lobes at higher frequencies which would introduce higher levels of directional interference into the receiver and signal processor.

In embodiments, one, but not both, of the twin whip antenna elements is coupled to the receiver equipment by a delay line (i.e. a signal path which introduces a delay). The delay line can be used to increase directivity of twin whip antennas in one direction by adding the signals from each monopole in phase, which increases the antenna gain to one side of the ship and reduces interference levels coming from the other side of the ship. Thus, whereas a receive ship generally sails in a given direction relative to the target area, the delay line can be reversed to allow the ship to sail in the opposite direction.

Referring now to FIG. 8, an exemplary equipment shelter layout 800 upon a receive ship (such as ship 600 in FIG. 6), is shown from a top view perspective. The layout generally includes the same kinds of equipment shelters discussed above with the transmit ship layout 400 of FIG. 4 and, for simplicity of explanation, similar kinds of equipment shelters have similar designations in FIGS. 4 and 8 and only certain differences will be discussed herein. Wherein the transmit ship layout 400 includes antenna storage containers (e.g. 408) and transmitter equipment shelters (e.g. 414), the receive ship layout 600 includes containers (typified by container 802 and generally labeled "A&R") used both to store the antenna elements and shelter the receiver equipment. Further, wherein the transmit ship layout 400 includes transmitter control containers 420, the receive ship layout 600 includes receiver control containers (typified by container 804 and generally labeled "RC"). The receive ship layout may further include HVAC, generator, and/or power distribution containers, discussed above in connection with FIG. 4. In some embodiments, a plurality of containers, such as containers 806, are arranged to form a generally continuous, flat surface to support a ground screen.

Figure 9:
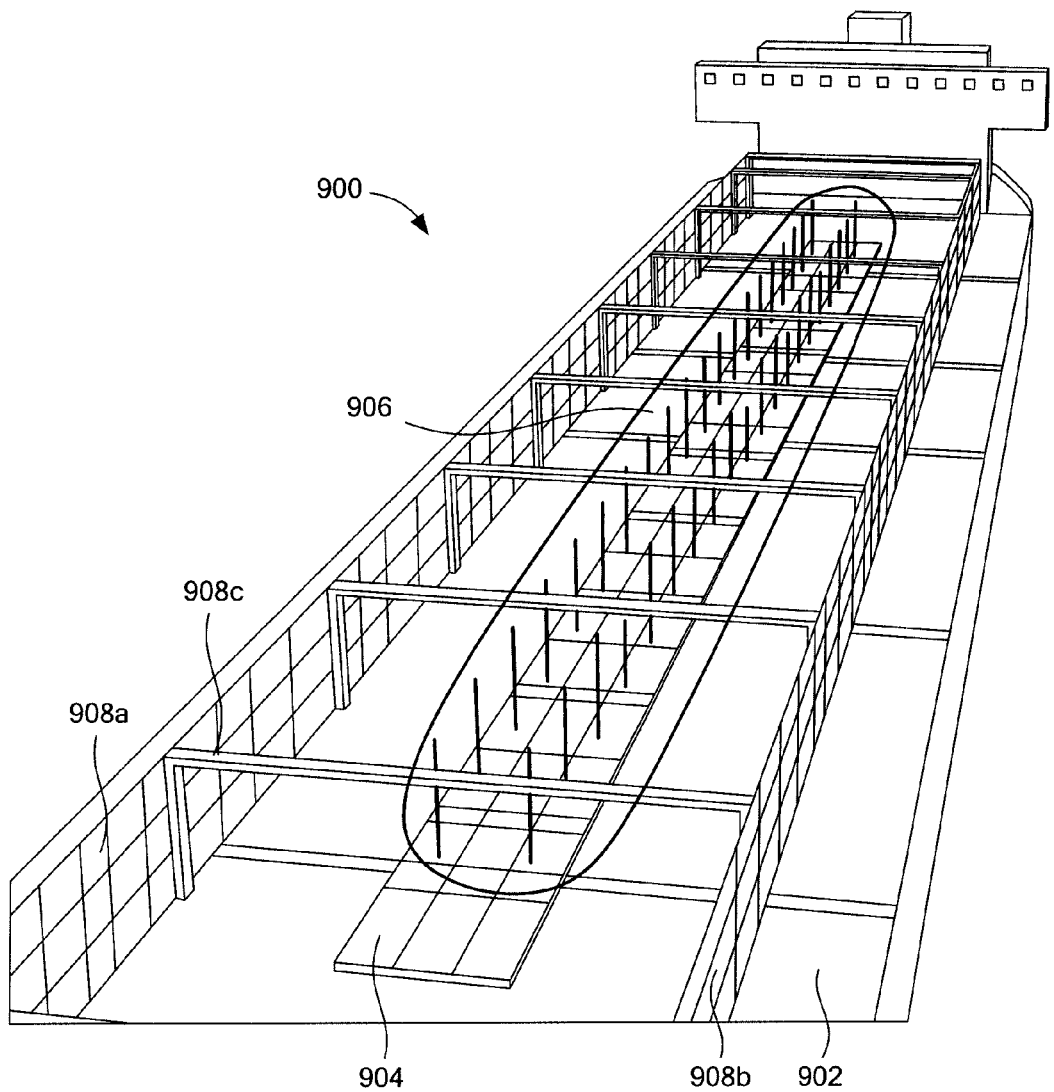
FIG. 9 is a perspective view of an exemplary receive ship having a radome.

Referring now to FIG. 9, an exemplary receive ship 900 includes a deck 902, a ground screen 904 disposed/supported upon the deck, and a receive antenna 906 disposed upon the ground screen. The receive antenna 706 is protected by a radome comprising a pair of walls 908a, 908b which extend along the length of the antenna 906. In embodiments, the walls 908a, 908b are taller than the antenna elements and have emissivity that doesn't degrade performance. The radome may also provide environmental protection for the antenna 906. The radome walls 908a, 908b may be mechanically connected via cross bars 908c, which generally extend transverse to the ship's longitudinal axis, as shown. A similar radome may be included upon a transmit ship.

Figure 10:
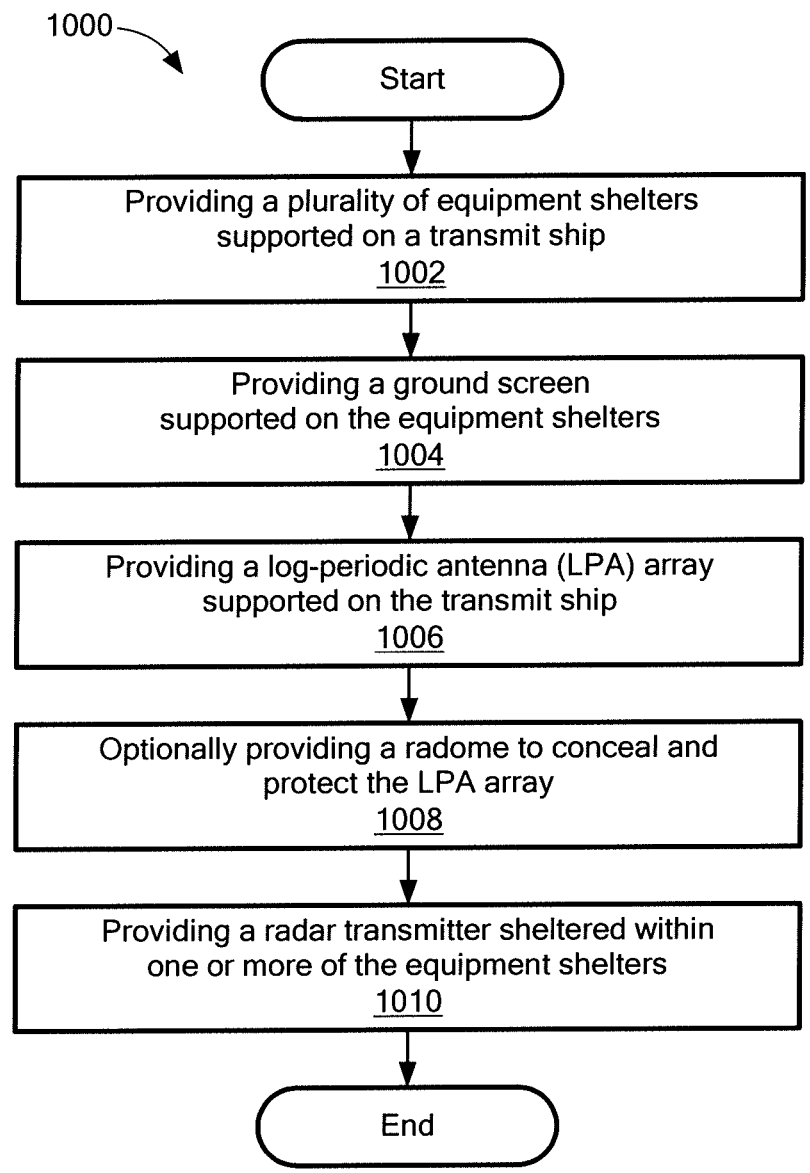
FIG. 10 is a flowchart showing an exemplary method for providing a ship-based OTH radar transmitter.

FIG. 10 shows an exemplary method 1000 for providing a transmit ship used within an OTH radar system. In block 1002, a plurality of equipment shelters are provided, which may be supported on the transmit ship's deck. In block 1004, a ground screen is provided, which may be supported on the equipment shelters or, more directly, on the transmit ship's deck. The ground screen may comprise a plurality of reflective panels bonded together (mechanically and/or electrically) to form a generally continuous flat surface. In block 1006, a transmit antenna, also supported on the transmit ship, is provided. The transmit antenna is configured to transmit radar signals towards the Ionosphere. In an exemplary embodiment, the transmit antenna comprises an LPA array.

In block 1008, which is optional, a radome is provided to protect the transmit antenna, such as from the environment. The radome may include a plurality of walls with emissivity that doesn't degrade performance. In block 1010, a radar transmitter is provided to generate radar signals (for transmission by the transmit antenna) having a selected characteristics (e.g. frequency, polarization, and direction) to refract off the Ionosphere towards a selected target area, and to reflect off one or more objects within the selected target area to be received by a receive ship. The transmit signal characteristics may be selected based on the position of the receive ship and/or based on ionospheric conditions. In an exemplary embodiment, the radar transmitter is sheltered within one or more of the equipment shelters.

Figure 11:
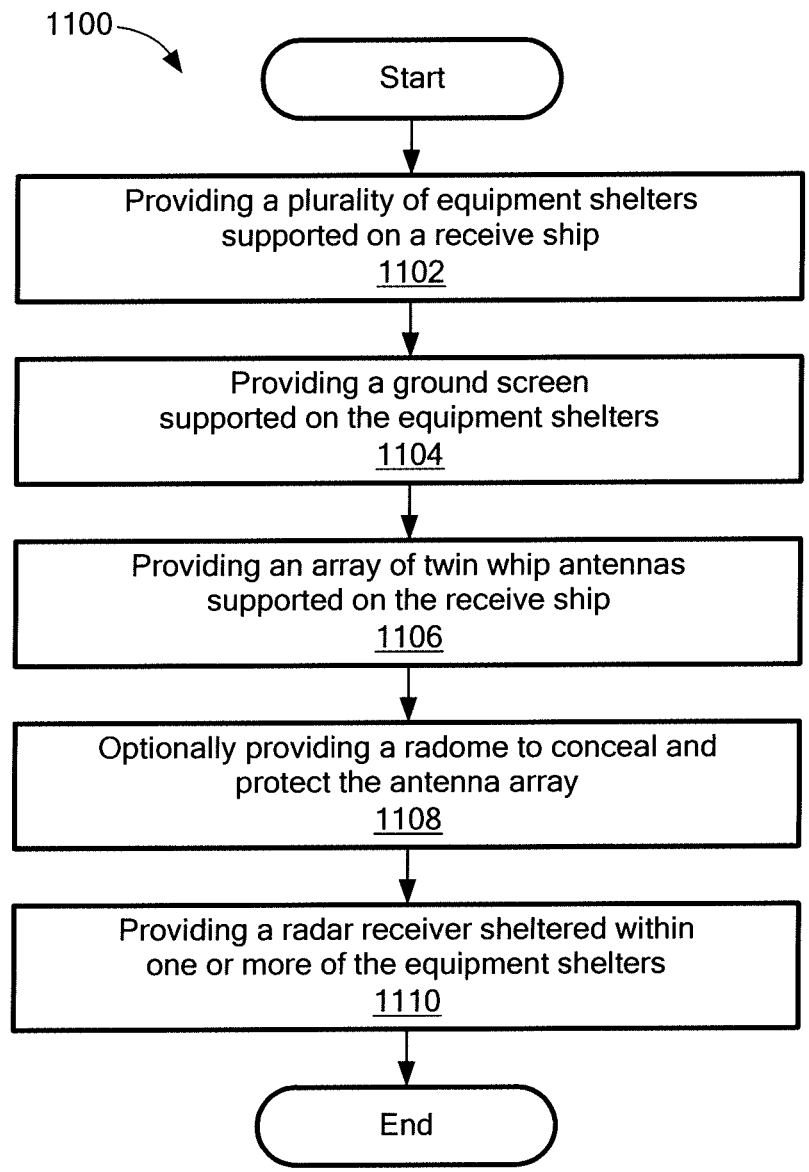
FIG. 11 is a flowchart showing an exemplary method for providing a ship-based OTH radar receiver.

FIG. 11 shows an exemplary method 1100 for providing a receive ship used within an OTH radar system. In block 1102, a plurality of equipment shelters are provided, which may be supported on the receive ship's deck. In block 1104, a ground screen is provided, supported on the equipment shelters or directly on the receive ship's deck. The ground screen may comprise a plurality of reflective panels bonded together (mechanically and/or electrically) to form a generally continuous flat surface and sized to take into account the sea as a reflective medium. In block 1106, a receive antenna, also supported on the receive ship, is provided. The receive antenna is configured to receive radar signals reflected off one or more objects within a selected target area and refracted off the Ionosphere. In an exemplary embodiment, the receive antenna comprises an array of twin whip antennas. In some embodiments, the ground screen and/or the receive antenna can be readily disassembled and stored within one or more of the equipment shelters.

In block 1108, which is optional, a radome is provided to protect the receive antenna, such as from the environment. The radome may include a plurality of walls with emissivity that doesn't degrade performance. In block 1110, a radar receiver is provided to process the received radar signals to detect the one or more objects within the target area. The radar receiver may be sheltered within one or more of the equipment shelters, any of which may comprise a standard commercial shipping container. In embodiments, the radar receiver is configured to compensate for the movement of the receive ship and/or to use SAR-based signal processing techniques.

Figure 12:
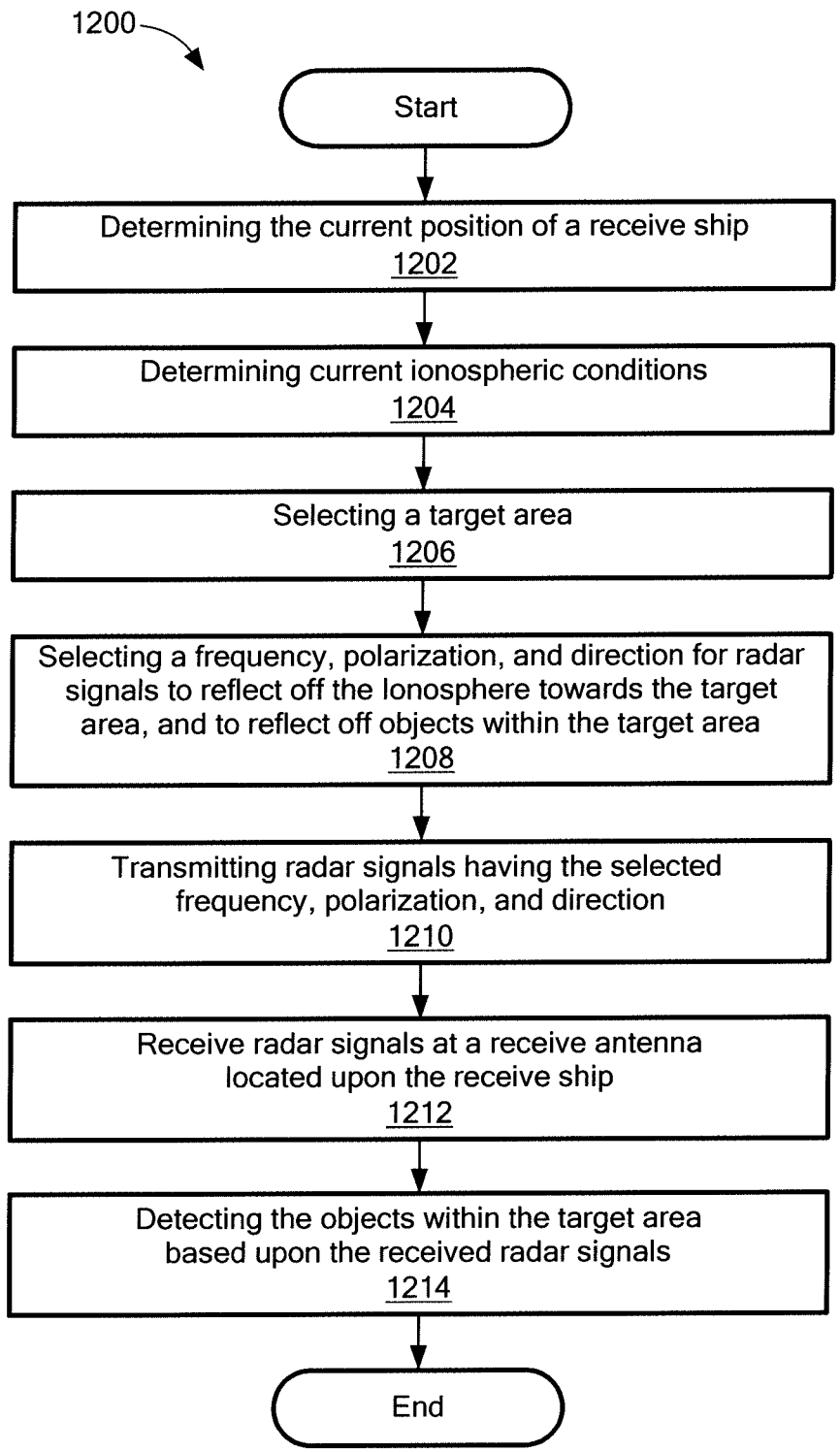
FIG. 12 is a flowchart showing an exemplary method for use with an OTH radar system.

FIG. 12 shows an exemplary method 1200 for use within a ship-based OTH radar system having a transmitter and a receiver. The receiver is located upon a ship ("the receive ship") and the transmitter may be located either on ground or on a ship. The method 1200 may be performed by personnel and/or computer systems collocated with the receiver, the transmitter, and/or a third platform (such as COCOM 108 in FIG. 1).

In block 1202, the current position of the receive ship is determined (e.g. using GPS) and, in block 1204, the current ionospheric conditions are determined. In block 1206, a target area is selected, which may include one or more objects ("targets"). In block 1208, radar signal characteristics (e.g. frequency, polarization, and direction) are selected such that transmitted radar signals refract off the Ionosphere toward the target area, and reflect off the targets to be received by the radar receiver. In block 1210, the radar transmitter (using a transmit antenna) transmits radar signals having the selected characteristics. In block 1212, radar signals are received by the ship-based radar receiver (using a receive antenna) and, in block 1214, objects are detected within the target area based upon the received radar signals.

Figure 13:
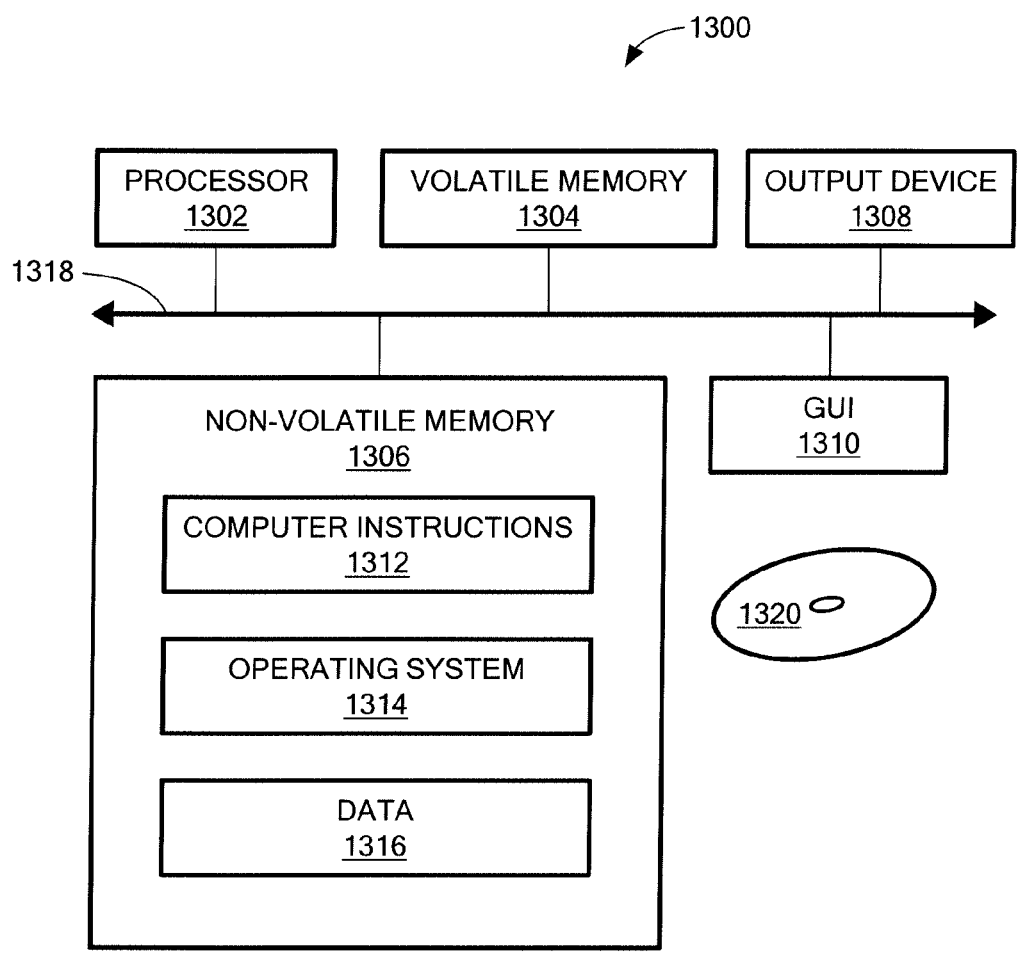
FIG. 13 is a schematic representation of an exemplary computer that can form a part of an OTH radar system.

It should be appreciated that FIG. 12 show a flowchart corresponding to the above contemplated techniques which could be implemented in one or more computer systems, such as computer system 1300 in FIG. 13. Rectangular elements (typified by element 1202), herein denoted "processing blocks," represent computer software instructions or groups of instructions. Alternatively, the processing blocks represent steps performed by functionally equivalent circuits such as a digital signal processor circuit or an application specific integrated circuit (ASIC). The flow diagram does not depict the syntax of any particular programming language, but rather illustrates the functional information one of ordinary skill in the art requires to fabricate circuits or to generate computer software to perform the processing required of the particular apparatus. It should be noted that many routine program elements, such as initialization of loops and variables and the use of temporary variables are not shown.

It should be appreciated that, that unless otherwise indicated herein, the particular sequence of blocks described above in conjunction with FIGS. 10-12 are illustrative only and can be varied without departing from the spirit of the systems and methods sought to be protected herein. Thus, unless otherwise stated the blocks described above are unordered meaning that, when possible, the steps can be performed in any convenient or desirable order.

FIG. 13 shows an exemplary computer 1300 that can perform at least part of the processing described herein. The computer 1300 includes a processor 1302, a volatile memory 1304, a non-volatile memory 1306 (e.g., hard disk), an output device 1308 and a graphical user interface (GUI) 1310 (e.g., a mouse, a keyboard, a display, for example), each of which is coupled together by a bus 1318. The non-volatile memory 1306 stores computer instructions 1312, an operating system 1314, and data 1316. In one example, the computer instructions 1312 are executed by the processor 1302 out of volatile memory 1304. In one embodiment, an article 1320 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

All references cited herein are hereby incorporated herein by reference in their entirety.

Having described exemplary embodiments, which serve to illustrate various concepts, structures, and techniques sought to be protected herein, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A method for providing an over-the-horizon (OTH) radar system, the method comprising:
   providing a receive ground screen comprising a reflective surface and adapted to form a generally continuous flat surface supported on a surface of a receive ship;
   providing a receive antenna adapted to be supported on the surface of a receive ship and configured to receive radar signals reflected off one or more objects within a selected target area and refracted off the Ionosphere; and
   providing a radar receiver to process the received radar signals to detect the one or more objects.

2. The method of claim 1 wherein the receive ground screen comprises a plurality of reflective panels electrically bonded together.

3. The method of claim 1 further comprising providing a plurality of equipment shelters capable of being arranged on the receive ship to form a generally continuous flat surface to support the receive ground screen.

4. The method of claim 3 wherein the receive antenna is further adapted to be stored within or more of the equipment shelters.

5. The method of claim 3 wherein the ground screen is further adapted to be stored within one or more of the equipment shelters.

6. The method of claim 1, further comprising providing a plurality of walls to protect the receive antenna.

7. The method of claim 1 wherein the receive antenna comprises an array of twin whip antenna elements.

8. The method of claim 1 wherein the receive antenna comprises a plurality of loop antennas.

9. The method of claim 1 wherein the radar receiver is configured to compensate for movement of the ship.

10. The method of claim 1 wherein the radar receiver is configured to use synthetic aperture radar (SAR) techniques to increase the effective antenna aperture size.

11. The method of claim 1 wherein the receive ground screen is sized to take into account the sea as a reflective medium.

12. The method of claim 1 further comprising:
   providing a transmit ground screen comprising a reflective surface and adapted to form a generally continuous flat surface supported on a transmit ship;
   providing a transmit antenna adapted to be supported on the transmit ship and configured to transmit radar signals towards the Ionosphere; and
   providing a radar transmitter to generate radar signals for transmission by the transmit antenna,
   wherein the transmitted radar signals have a selected frequency, polarization, and direction to refract off the Ionosphere towards a selected target area, and to reflect off the one or more objects within the selected target area to be received by the receive ship.

13. The method of claim 12 wherein the transmit antenna comprises a log-periodic antenna (LPA) array.

14. The method of claim 12 wherein the frequency, polarization, and direction of the transmitted radar signals are selected based upon the position of the receive ship and ionospheric conditions.

15. A method, comprising:
transmitting radar signals from a transmit antenna, the transmitted radar signals having a selected frequency, polarization, and direction to refract off the Ionosphere towards a selected target area, and to reflect off one or more objects within the selected target area;
receiving radar signals at a receive antenna located upon a receive ship, the received radar signals having been reflected off the one or more objects in the target area in response to the transmitting; and
detecting the one or more objects within the target area based upon the received radar signals.

16. The method of claim 15 further comprising:
determining the position of the receive ship; and
determining the ionospheric conditions,
wherein the frequency, polarization, and direction of the transmitted radar signals are selected based upon the position of the receive ship and ionospheric conditions.

17. The method of claim 15 where the transmit antenna is located upon a transmit ship.

18. An over-the-horizon (OTH) radar system, comprising:
a receive ship;
a receive ground screen having a generally continuous, flat, reflective surface and supported on the receive ship;
a receive antenna supported on the receive ship and configured to receive radar signals, the received radar signals having been reflected off one or more objects within a target area and refracted off the Ionosphere; and
a radar receiver to detect the one or more objects within the target area based upon the received radar signals.

19. The system of claim 18 further comprising a plurality of equipment shelters capable of being arranged on the receive ship to form a generally continuous flat surface to support the receive ground screen.

20. The system of claim 18 wherein the receive antenna comprises an array of twin whip antenna elements.

* * * * *